Figure 1:
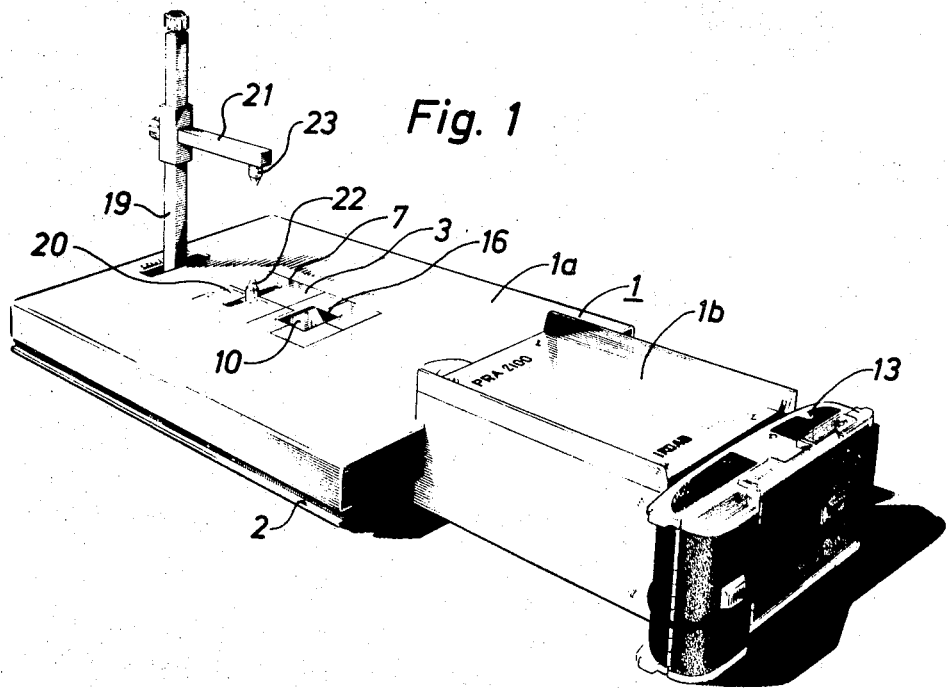

United States Patent
Bogren et al.

[15] 3,679,901
[45] July 25, 1972

[54] DEVICE FOR SIMULTANEOUS RADIOGRAPHICAL AND PHOTOGRAPHICAL EXAMINATIONS ON THE EYE AND THE ORBITAL REGION

[72] Inventors: Hugo Bogren, Bastra Frolunda; Gosta Elfstrom, Molndal; Bjorn Tengroth, Goteborg, all of Sweden

[73] Assignee: Incentive Research & Development AB, Bromma, Sweden

[22] Filed: Oct. 5, 1970

[21] Appl. No.: 78,003

[30] Foreign Application Priority Data

Oct. 6, 1969 Sweden.............................13717/69

[52] U.S. Cl. ..............................250/59, 250/65 R, 356/162
[51] Int. Cl. ..........................................................G03b 41/16
[58] Field of Search.................................356/162; 250/65

[56] References Cited

UNITED STATES PATENTS 3,514,606   5/1970   Rabey...........................250/65 R
2,474,421   6/1949   Hollstein.......................250/105

Primary Examiner—James W. Lawrence
Assistant Examiner—C. E. Church
Attorney—Waters, Roditi, Schwartz & Nissen

[57] ABSTRACT

The invention concerns a device for the localization of intraocular foreign bodies and for exophthalmometry. The device can be mounted on any standard model of an X-ray stand usable for skull examination and makes it possible to take simultaneously a radiograph and a photograph of the orbital region of the patient. The photograph and the radiograph are obtained on transparent film material and with exactly the same magnification. The photograph and the radiograph are positioned upon each other in a correct relative position and viewed together in penetrating light. The combined radiograph and photograph reveales both the skeleton and the soft parts as well as any foreign radiopaque bodies in the orbital region and the anterior part of the skull, wherefore the position of any such foreign body can be easily determined or any exophthalmos can be easily detected and accurately measured respectively.

6 Claims, 2 Drawing Figures

PATENTED JUL 25 1972   BEST AVAILABLE COPY   3,679,901

DEVICE FOR SIMULTANEOUS RADIOGRAPHICAL AND PHOTOGRAPHICAL EXAMINATIONS ON THE EYE AND THE ORBITAL REGION

The invention is related to a device for examinations on the eye, the orbit and adjacent parts of the skull of a human patient.

A major problem when detecting and localizing foreign bodies in the orbit or the eye ball by means of X-ray diagnosis, so called radiography, is caused by the fact that the foreign body, when consisting of a radiopaque material as for instance metal, as well as the skeletal parts surrounding the orbit will be very clearly visible on the X-ray picture, the so called radiograph, whereas on the contrary the eye ball and other soft tissues and parts in the orbit will be reproduced very poorly. This makes it very difficult by means of the radiograph to determine the precise localization of the foreign body in the orbit or eye ball respectively, whereby it becomes difficult and in many cases impossible to remove the foreign body.

A similar problem exists when detecting and measuring exophthalmos and enophthalmos on a patient. When using prior art methods and devices for this purpose one measures the distance between the corneal vertex and a predetermined reference point on the outside of the head of the patient. As such a reference point one selects generally a point where the soft tissue is thin so that a well-defined reference point can be obtained from a subjacent skeletal part. However, these prior art measuring devices and methods have given very inaccurate and uncertain results, mainly due to the fact that the facial skeleton is often asymmetric and that very large variations exist between individual patients with respect to the shape and size of the facial skeleton.

These difficulties can be eliminated or substantially reduced when using a device according to the present invention.

The device according to the invention comprises a casing adapted to be mounted on the X-ray film holder stage of a standard X-ray stand for skull examination and provided with oppositely positioned X-ray radiation windows in the lower wall of the casing facing the film holder stage and in the opposite upper wall of the casing respectively, at least said latter window in the upper wall of the casing being transparent also to optical radiation, an optical mirror mounted inside said casing between said windows so as to be oblique relative to the direction of the X-ray radiation and to have its reflecting surface facing the window in said upper wall of the casing, a photographic camera system including a camera optics with an associated shutter mechanism mounted in said casing, a film holder for a photographic film, said camera system having its optical axis directed towards said mirror so as to be deflected by said mirror out through the window in said upper wall of the casing substantially parallel to the direction of the X-ray radiation, and a cephalostat device supported by said casing for fixing the head of the patient in desired position in front of the window in said upper wall of the casing.

By means of the device according to the invention, which can be mounted on any conventional X-ray stand for skull examination, it is possible to produce simultaneously a radiograph as well as a photograph of the orbital region and the anterior part of the skull. On the radiograph all skeletal parts and any foreign bodies will be clearly visible, whereas the photograph clearly shows the superficially visible soft parts, as for instance the eye ball, the pupil, the cornea, the eye-lids, etc. Both pictures are obtained in the same scale and on transparent film material. By positioning the radiograph and the photograph upon each other in correct relative position and viewing them together in penetrating light it becomes possible, for instance when localizing foreign bodies in the eye ball or the orbit, to determine the position of the foreign body very accurately. By taking a lateral picture as well as a frontal picture of the orbital region it becomes possible to determine the position of the foreign body very accurately in the horizontal plane as well as the vertical plane. Tests have shown that in this way it is possible to determine the position of a foreign body with an error or uncertainty which very seldom exceeds 0.5 mm.

When using the device according to the invention for the measurement of exophthalmos only a lateral picture of the orbital region and the anterior part of the skull is taken. On the combined radiograph and photograph the cornea as well as the various skeletal parts in the anterior part of the skull will be clearly visible, whereby it is very easy to measure accurately the distance from the corneal vertex to a suitable predetermined skeletal part in the anterior part of the skull selected as a reference point. In this case it is possible to use the same skeletal part as a reference point for both eyes of the patient, which is a very great advantage, as it makes it possible to determine more accurately any difference in exophthalmos for the two eyes. Further, one can use as a reference point a skeletal part in the interior of the skull, which is advantageous for the accuracy of the measurement, as such skeletal parts are subject to smaller individual variations in their position than parts of the facial skeleton. As a reference point for the measurement one uses preferably the fore edge of the sella turcica. This reference point has the advantage that it is located in the sagittal plane of the skull. As the distance between this reference point and the corneal vertex is influenced also by the length of the skull, it should be compared with or related to another distance which is only dependent on the length of the skull. As such a reference distance one selects preferably the distance from said reference point at the fore edge of the sella turcica to the nasion or more exactly the bone suture between the frontal bone and the nasal bone. Also this distance can be measured very easily and accurately on the combined radiograph and photograph produced by means of the device according to the invention, as the suture between the frontal bone and the nasal bone stands out clearly on the radiograph.

Figure 2:
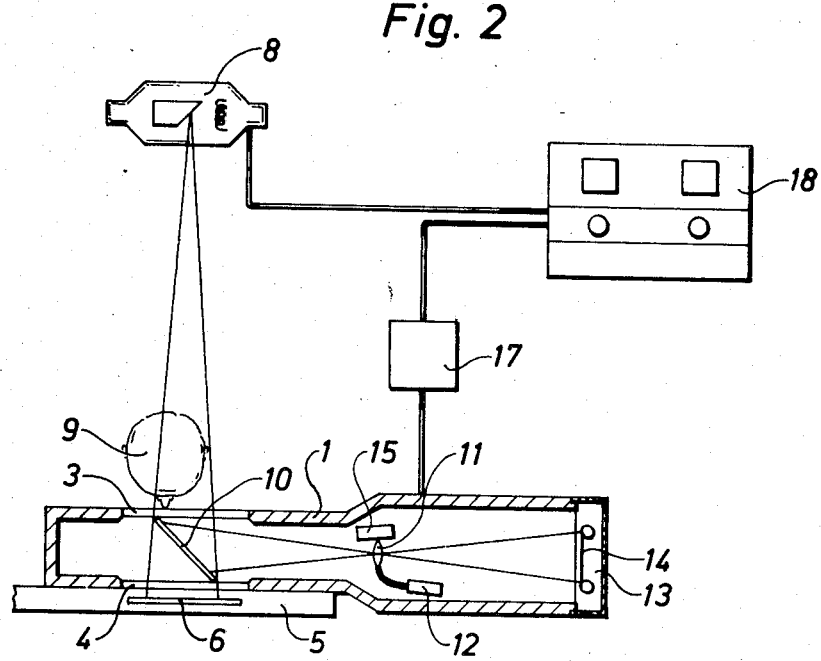

In the following the invention will be further described with reference to the accompanying drawings, in which FIG. 1 is a perspective view of a practical embodiment of the device according to the invention, whereas, FIG. 2 illustrates schematically the principal design and mode of operation of the device.

The embodiment of the invention shown only by way of example in the drawing comprises an apparatus casing 1 consisting of two substantially box-shaped parts 1a and 1b. The part 1a of the casing has the shape of a comparatively thin, rectangular box, which is provided on its bottom with mounting rails 2 or similar members, by means of which the apparatus casing can be mounted upon the stage 5 containing the X-ray film holder 6 of a standard type X-ray stand for skull examination. In it upper side as well as its lower side or bottom, not visible in FIG. 1, the part 1a of the casing is provided with oppositely positioned windows or openings 3 and 4, respectively, which are permeable to the X-ray radiation and are positioned immediately above the X-ray film 6 in the stage 5 of the X-ray stand. These openings or windows 3 and 4 may be covered for instance with plexiglass plates 7. The X-ray radiation from the X-ray tube 8 of the X-ray stand will consequently pass through the two windows 3 and 4 in the apparatus casing to the X-ray film 6 and in this way produce a radiograph of an object, as for instance the skull 9 of a patient, positioned on the apparatus casing 1a.

An optical mirror 10 is mounted in the part 1a of the casing between the two windows 3 and 4 so as to form an angle of 45° to the direction of the X-ray radiation and to have its reflecting surface facing the window 3 in the upper side in the apparatus casing 1a. The part 1b of the apparatus casing contains in the portion closest to the apparatus casing 1a a camera optics 11 with an associated shutter mechanism which is electromagnetically operable by means of a solenoid 12. The optical axis of the camera optics 11 is directed towards the mirror 10 so as to be deflected by this out through the window 3 in the upper side of the apparatus casing 1a in a direction substantially parallel to the direction of the X-ray radiation. A holder 13 for a photographic film 14 is removably attached to the opposite end of the apparatus casing 1b. Preferably a holder for a direct-developing film material of the Polaroid type is used. Via the mirror 10 the optics 11 can focus upon the film 14 in the film holder 13 an image of the portion of the head 9 of the patient located above the window 3 in the upper side of the casing 1a. During the photographical exposure said portion of the head is illuminated by means of an electronic photo-flash 15 which is mounted inside the casing 1b at one side of the camera optics 11 so as to emit its light towards the mirror 10.

In the embodiment of the invention illustrated in the drawing the plexiglass plate 7 in the window 3 in the upper side of the casing 1a is provided with an opening 16 immediately above the mirror 10, whereby the light rays for the optical photograph do not have to pass through the plexiglass plate 7.

The photo-flash 15 and the shutter mechanism operated by means of the solenoid 12 are controlled from a control unit 17 which is in its turn controlled from the normal control and operating unit 18 of the X-ray stand in such a way that the photographical exposure takes place immediately after the X-ray exposure. A control signal for the control unit 17 can for instance be obtained from the means, for instance time relays, in the control unit 18 of the X-ray stand which determine the length of the X-ray exposure.

A cephalostat device is provided for fixing the head of the patient in the desired position above the window 3 in the casing 1a. This cephalostat device comprises a vertical column 19 having its lower end mounted inside the casing 1a in a manner permitting a lateral adjustment of the position of the column and two horizontal arms 20 and 21 supported by the column 19. The lower arm 20 is located inside the casing 1a and is stationarily attached to the column 19, whereas the upper arm 21 is movable in vertical direction upon the column 19. The two arms 20 and 21 are provided with conical plugs 22 and 23 respectively which can for instance be inserted in the external acustic meati of the patient for fixing the head of the patient in a correct position.

For a frontal picture of the orbital region the head 9 of the patient is positioned with the face turned towards the upper side of the apparatus casing 1a and the eye to be examined immediately above the mirror 10, as schematically illustrated in FIG. 2. For a lateral picture of the orbital region the head of the patient is positioned with the cheek turned towards the upper side of the apparatus casing 1a and the eye to be examined closest to the apparatus casing.

We claim:

1. A device for a simultaneous radiographical and photographical examination of the eye, the orbital region and adjacent parts of the skull of a patient, in particular for the purpose of localizing foreign bodies in the eye or the orbit or for exophthalmometry, comprising an apparatus casing adapted to be mounted on the X-ray film holder stage of a standard type X-ray stand adapted for skull examination, said apparatus casing being provided with oppositely positioned X-ray radiation windows in the wall of the casing facing said stage and in the opposite upper wall of the casing respectively, at least the X-ray radiation window in said upper wall of the casing being transparent also to optical radiation, an optical mirror mounted inside said apparatus casing between said opposite windows so as to be oblique relative to the direction of the X-ray radiation and to have its reflecting surface facing the X-ray radiation window in said upper wall of the casing, a photographical camera system including a camera optics with an associated shutter mechanism mounted in said apparatus casing and a holder for a photographical film, said camera system having its optical axis directed towards said optical mirror so as to be deflected thereby out through the window in said upper wall of said apparatus casing in a direction substantially parallel to the X-ray radiation, and a cephalostat device supported by said apparatus casing for fixing the head of the patient in a desired position in front of the window in said upper wall of said apparatus casing.

2. A device as claimed in claim 1, comprising an electronic photo-flash device mounted inside said apparatus casing so as to emit its light towards said mirror.

3. A device as claimed in claim 1, wherein said optical camera system is adapted to produce a photograph of an object positioned in front of the window in said upper wall of said apparatus casing with the same degree of magnification as the radiograph of the same object produced by said X-ray stand.

4. A device as claimed in claim 2, comprising means responsive to a control signal from a control unit of said X-ray stand for operating said photo-flash means and said shutter mechanism immediately after a completed X-ray exposure.

5. A device as claimed in claim 1, wherein said holder for the photographic film is removably attached to said apparatus casing.

6. A device as claimed in claim 1, wherein said holder for the photographic film is adapted for a direct-developing film material.

* * * * *